United States Patent Office 3,166,558
Patented Jan. 19, 1965

3,166,558
METHOD FOR PREPARING DIAZABICYCLO-(2,2,2)-OCTANE
Rocco L. Mascioli, Media, Pa., assignor to Air Products and Chemicals, Inc., a corporation of Delaware
No Drawing. Filed Aug. 11, 1961, Ser. No. 130,750
2 Claims. (Cl. 260—268)

The present invention relates to the preparation of triethylene diamine, also known as diazabicyclo-(2,2,2)-octane, and is particularly concerned with improved processes for the synthesis of this compound in increased yields from readily available and comparatively inexpensive raw materials.

Diazabicyclo-octane is commercially employed as a catalyst for base-catalyzed reactions, particularly in the preparation of polyurethane plastics, elastomers and foams. While this compound had been reported in the literature considerably earlier, the first production thereof in commercial quantities was achieved only in recent years by processes involving vapor phase reaction of certain alkylene polyamines over solid acidic catalyst, as described, for example, in U.S. Patent No. 2,937,176. With increasing demand for the compound, attention has been directed to improved methods of production to obtain increased yields of product, and/or lower production costs.

Early attempts to obtain diazabicyclo-octane by ring closure of a beta-substituted N-ethyl piperazine had been unsuccessful or obtained yields of no more than about one to several percent. After a number of unsuccessful attempts, Hromatka [Berichte 75B, 1302 (1942)] reported the production of diazabicyclo-octane in fair yields by carefully controlled heating of N-beta bromoethyl piperazine hydrobromide; smaller yields were obtained from the corresponding hydrochloride, while the corresponding N-hydroxyethyl compound gave considerably poorer yields.

The conversion of N-mono- and N-N'-bis-hydroxyethylpiperazines to diazabicyclo-octane by catalytic vapor phase reaction over silica-alumina, is reported by Ishiguro et al. [J. Pharm. Soc. Japan, 75, 1370 (1955); abstracted in Chem. Abs., 50, 10106, (1956)]. According to U.S. Patent No. 2,985,658, acceptable yields of diazabicyclo-octane are obtained from N-aminoethylpiperazine over acidic siliceous cracking catalyst.

It has now been found that improved yields of diazabicyclo-octane are obtained from N-mono-, or N-N'-bis-hydroxyethylpiperazine or from mixtures of these, by continuous vapor phase reaction in which such hydroxyethylpiperazine compound or mixture is passed over siliceous cracking catalyst together with at least 2 mols of a gasiform diluent which is stable and non-reactive under the operating conditions employed.

In the preferred practice of the invention the liquid reactant and the gasiform diluent are introduced separately into a closed reactor containing a fixed bed of the heated catalyst in granular or pellet form; vapor reaction products being continuously discharged at the opposite end of the catalytic reactor. If the diluent is liquid at ambient temperature, it may be charged in that form in admixture with the hydroxyethylpiperazine or separately. Reaction is carried out at temperatures in the range of 500–800° F., preferably at about 650–700° F., and at space rates (LHSV) of from about 0.2 to 1.0 based on liquid volumes of the hydroxyethylpiperazine compounds charged per volume of catalyst. While superatmospheric pressures can be used, these offer no advantage over atmospheric or subatmospheric pressure operation. The diluent gas may be used in quantities as high as 10 or more mols/mol of hydroxyethylpiperazine compound, preference being had for proportions in the range of 3 to 5 mols/mol.

Any non-reactive gas, vapor or vaporized liquid which is inert or non-reactive in the operation may be used. Ammonia is a preferred diluent meeting the requirements as well as being cheap and readily available. Other diluents that may be used include nitrogen and volatile hydrocarbons of saturated aliphatic or aromatic types, which are sufficiently refractory so as not to be cracked at the reaction temperature employed; examples of which are pentane, heptane, benzene, and toluene.

Both N-hydroxyethylpiperazine and N-N'-bis-hydroxyethylpiperazine

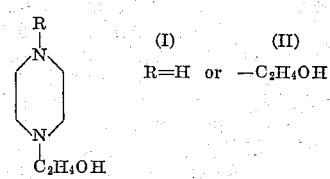

$R=H$ or $-C_2H_4OH$ may be available commercially in moderate quantities. The mono compound (I) can be readily prepared by known reaction of piperazine with ethylene oxide. Of particular interest here is that the bis compound (II) is obtained in attractive yield from diethanolamine by cyclodehydration. In the latter reaction, it is not necessary to isolate the pure N,N'-bis-hydroxyethylpiperazine; but the total reaction product after removal of the water, can be charged to the catalytic reactor for production of the diazabicyclo-octane.

Because of the high concentrations of diazabicyclo-octane in the reactor effluent obtained by the process of the invention, a major portion of the diazabicyclo-octane can be initially recovered as a solid of good purity which is formed when the reaction product is cooled. This solid is essentially a hydrate of diazabicyclo-octane with some adherent mother liquor.

EXAMPLE I

N-hydroxyethylpiperazine was passed over activated kaolin catalyst in a fixed bed reactor in a number of separate runs at the conditions shown in Table I below. In certain of the runs, as indicated, inert gasiform diluent was added with the charge in the proportion specified:

Table I

| Run No. | 1 | 2 | 3 | 4 | 5 | 6 | 7 | 8 |
|---|---|---|---|---|---|---|---|---|
| LHSV | 0.41 | 0.42 | 0.4 | 0.4 | 1.2 | 0.41 | 1.22 | 1.42 |
| Temp., °F. (range) | 620–635 | 645–655 | 665–675 | 690–700 | 700–710 | 725–735 | 650–680 | 685–720 |
| Diluent | NH₃ | NH₃ | NH₃ | NH₃ | ¹ Bz | N₂ | None | None |
| Diluent/charge, mols | 4/1 | 4/1 | 4/1 | 4/1 | 4/1 | 3.5/1 | | |
| Liquid recovery, wt. percent | 90.5 | 89 | 92.6 | 91.3 | 96.4 | 84.5 | 93.3 | 92.7 |
| Composition of liquid reactor effluent: | | | | | | | | |
| Diazabicyclo-octane, wt. percent | 29.6 | 36.6 | 37.6 | 35.1 | 36.8 | 43.4 | 19.9 | 27.9 |
| Piperazine, wt. percent | 2.1 | 3.9 | 7.7 | 3.1 | | | 1.9 | 2.4 |
| Yield based on charge: | | | | | | | | |
| Diazabicyclo-octane, wt. percent | 26.8 | 32.6 | 34.8 | 32.0 | 35.3 | 36.7 | 18.5 | 25.8 |
| Wt percent of theoretical | 31 | 38.8 | 40.5 | 37.7 | 41 | 42.6 | 21.5 | 30 |

¹ Benzene.

The reported liquid hourly space velocity (LHSV) in the above table is based on the total liquid feed. In Run #5, this space velocity includes the benzene as well as the hydroxyethylpiperazine. It will be seen that at any severity level of operation over the range employed (residence time and temperature), use of the diluent obtains substantial yield improvement, in some instances the yield of diazabicyclo-octane being almost doubled.

The catalyst used in the above runs was an activated kaolin catalyst produced by the methods described in U.S. Patent 2,904,520.

Other siliceous cracking catalysts that may be employed under substantially similar conditions include acid-activated bentonite clays and gels of the silica-alumina type, or such siliceous gels containing zirconia or magnesia substituting for all or part of the alumina. The siliceous cracking catalysts are those generally having a surface area of at least 80 m.$^2$/g.; the preferred silica-alumina catalysts are those having a surface area of at least 180 m.$^2$/g. In general, the higher the activity of the catalyst the lower is the reaction temperature to be employed for best results.

Recovery of the diazabicyclo-octane from the reaction mixture is obtained by fractional distillation to separate a cut in the approximate boiling range of the desired compound (about 165 to 175° C.) which on cooling or redistillation and sublimation separates out crystals of diazabicyclo-octane of acceptable purity. By known techniques further recovery of crystalline product can be obtained from the mother liquor. If desired, recovery of the diazabicyclo-octane from the reaction effluent can be obtained by the method set out in aforesaid U.S. Patent No. 2,937,176. In accordance with the method therein described, a cut rich in diazabicyclo-octane is fractionated from a reaction effluent and cooled. The cooled fraction is purified by trituration one or more times with a normally liquid low boiling aliphatic hydrocarbon, such as n-pentane. Cooling and filtration thereafter yields a white crystalline solid of high purity diazabicyclo-octane.

EXAMPLE II

By an operation similar to that described in Example I, a charge composed of about 40% N-N'-bis-hydroxyethylpiperazine and 60% N-hydroxyethylpiperazine was passed over activated kaolin catalyst with about 4.5 mols ammonia/mol of charge. The reaction was effected in the temperature range of 665–680° F. and with a liquid hourly space velocity of 0.44. The liquid reactor effluent (87.8% by weight of charge) contained 46.7% by weight diazabicyclo-octane, which is 41.0% by weight of charge, equivalent to 64% of the theoretical yield.

EXAMPLE III

Diethanolamine was reacted with glacial acetic acid (10 mols/mol) in a stirred vessel for 20 hours at 190–220° C., with approximately 1 mol of water being discharged as steam. The liquid reactor effluent contained 34% of N-N'-bis-hydroxy-ethylpiperazine based on the initial amine and 39% based on the liquid product. The total liquid reactor effluent was passed over activated kaolin catalyst at 670 to 700° F. and at 0.46 LHSV, together with NH$_3$ added as diluent in a mol ratio of about 16. The yield of diazabicyclo-octane was 45.5% based on the N-N'-bis-hydroxyethylpiperazine, or 15.5% based on diethanolamine. Acid condensation of diethanolamine is similarly readily effected with other organic and inorganic acids such as propionic acid or phosphoric acid.

EXAMPLE IV

Diethanolamine was reacted with acetic acid for an extended time at elevated temperature in a manner similar to Example III with similar evolution of water. The liquid product amounted to 88.5% of the diethanolamine and contained 46% N,N'-bis-hydroxyethylpiperazine. The liquid product was admixed with N-hydroxyethylpiperazine to provide the charge for the reaction over kaolin catalyst to produce diazabicyclo-octane. The charge composition was 73.2% of the liquid product containing the N,N'-bis-hydroxyethylpiperazine and 26.8% N-hydroxyethylpiperazine.

Conversion to diazabicyclo-octane was effected over activated kaolin cracking catalyst at a temperature in the range of 680–690° F. with an LHSV of 0.4, with diluent ammonia present in a mol ratio of about 8 mols NH$_3$/mol of charge. The yield of diazabicyclo-octane was 42% based on the N,N'-bis-hydroxyethylpiperazine, or 19.2% based on the diethanolamine.

Obviously many modifications and variations of the present invention as hereinbefore set forth may be made without departing from the spirit and scope thereof and therefore only such limitations should be imposed as are indicated in the appended claims.

What is claimed is:

1. The method of preparing diazabicyclo-(2,2,2)-octane which comprises initially reacting diethanolamine under acid condensation conditions to eliminate water and effect ring closure producing a reaction product rich in N-N'-bis-hydroxyethylpiperazine, and passing the total reaction product over silica-alumina cracking catalyst at 500–800° F., together with at least 2 mols NH$_3$/mol of charge and fractionating the liquid effluent to isolate a cut consisting essentially of diazabicyclo-(2,2,2)-octane.

2. The method as defined in claim 1 wherein said acid condensation is effected in the presence of a minor quantity of glacial acetic acid and at a temperature of 370 to 440° F. for 10 to 20 hours, and at a pressure of from 1 to 20 atmospheres.

References Cited in the file of this patent

UNITED STATES PATENTS

| | | |
|---|---|---|
| 2,977,363 | Farkas et al. | Mar. 28, 1961 |
| 2,977,364 | Mascioli | Mar. 28, 1961 |
| 3,038,904 | Godfrey | June 12, 1962 |
| 3,056,788 | Brader | Oct. 2, 1962 |

OTHER REFERENCES

Chemical Abstracts, vol. 50, p. 10106 (1956).

Ishiguro et al.: Pharm. Soc. of Japan, vol. 75, pp. 1370–1373 (1955), RSI. P. 45.

Sasaki: Yuki Gosei Kagaku Kyckia Shi, vol. 16, pp. 614–624 (1958).